(12) United States Patent
Aki et al.

(10) Patent No.: US 11,516,877 B2
(45) Date of Patent: Nov. 29, 2022

(54) WIRELESS COMMUNICATION SYSTEM, SLAVE WIRELESS DEVICE AND MASTER WIRELESS DEVICE

(71) Applicant: SMC CORPORATION, Tokyo (JP)

(72) Inventors: Tomohiko Aki, Nagareyama (JP); Norimasa Ozaki, Moriya (JP)

(73) Assignee: SMC CORPORATION, Tokyo (JP)

( * ) Notice: Subject to any disclaimer, the term of this patent is extended or adjusted under 35 U.S.C. 154(b) by 55 days.

(21) Appl. No.: 16/978,389

(22) PCT Filed: Feb. 22, 2019

(86) PCT No.: PCT/JP2019/006718
§ 371 (c)(1),
(2) Date: Sep. 4, 2020

(87) PCT Pub. No.: WO2019/171979
PCT Pub. Date: Sep. 12, 2019

(65) Prior Publication Data
US 2021/0059007 A1 Feb. 25, 2021

(30) Foreign Application Priority Data
Mar. 6, 2018 (JP) .............................. JP2018-039324

(51) Int. Cl.
*H04W 76/30* (2018.01)
*H04W 76/10* (2018.01)
*H04W 84/20* (2009.01)

(52) U.S. Cl.
CPC ........... *H04W 76/30* (2018.02); *H04W 76/10* (2018.02); *H04W 84/20* (2013.01)

(58) Field of Classification Search
CPC ..... H04W 76/30; H04W 76/10; H04W 84/20; H04W 64/00; H04W 76/34; H04W 4/33;
(Continued)

(56) References Cited

U.S. PATENT DOCUMENTS

| | | | |
|---|---|---|---|
| 6,856,844 B1* | 2/2005 | McKenzie | G05B 19/4183 700/219 |
| 2001/0018350 A1* | 8/2001 | Hachimura | H04W 84/16 455/554.1 |

(Continued)

FOREIGN PATENT DOCUMENTS

| CN | 101644930 B | 3/2013 |
|---|---|---|
| JP | 2003-332974 A | 11/2003 |

(Continued)

OTHER PUBLICATIONS

Extended European Search Report dated Nov. 5, 2021 in corresponding European Patent Application No. 19764648.2, 10 pages.
(Continued)

*Primary Examiner* — Will W Lin
(74) *Attorney, Agent, or Firm* — Oblon, McClelland, Maier & Neustadt, L.L.P.

(57) ABSTRACT

A wireless communication system allows the movement of a carriage or an automated conveyance vehicle to which a plurality of slave wireless device and a plurality of appliances are provided. A master control unit of a master wireless device uses a master communication unit to transmit a cut-off request signal to a slave wireless device deviating from a communication-target region. If a slave communication unit receives the cut-off request signal, a slave control unit of the slave wireless device cuts off a wireless connection.

5 Claims, 8 Drawing Sheets

(58) Field of Classification Search
CPC .. G05B 2219/15117; G05B 2219/2231; G05B 19/0421
See application file for complete search history.

(56) References Cited

U.S. PATENT DOCUMENTS

| | | | | |
|---|---|---|---|---|
| 2002/0177411 | A1* | 11/2002 | Yajima | H04W 48/16 455/500 |
| 2006/0146764 | A1* | 7/2006 | Takemoto | H04L 12/40065 370/468 |
| 2007/0288612 | A1 | 12/2007 | Hall | |
| 2012/0170491 | A1* | 7/2012 | Kern | H04L 45/50 370/260 |
| 2017/0093462 | A1* | 3/2017 | Kumaki | H04M 1/72412 |
| 2017/0289959 | A1 | 10/2017 | Aki et al. | |
| 2018/0207040 | A1* | 7/2018 | Fukuoka | H04W 52/0254 |
| 2021/0059007 | A1* | 2/2021 | Aki | H04W 76/30 |

FOREIGN PATENT DOCUMENTS

| | | | |
|---|---|---|---|
| JP | 2005-269593 | A | 9/2005 |
| JP | 2010-28637 | A | 2/2010 |
| JP | 2017-188868 | A | 10/2017 |

OTHER PUBLICATIONS

International Search Report dated May 7, 2019 in PCT/JP2019/0066718 filed on Feb. 22, 2019, 1 page.
Combined Taiwanese Office Action and Search Report dated Apr. 26. 2022, in Taiwanese Patent Application No. 108107246 w/partial English Translation, 22 pages.

* cited by examiner

| MASTER ID | BANK ID (BANK No.) | SLAVE ID | | | | | | |
|---|---|---|---|---|---|---|---|---|
| | | ID1 | ID2 | ... | ID(M-1) | IDM | | |
| MID1 | 0 | SID01 | SID02 | ... | SID0(M-1) | SID0M | | |
| | 1 | SID11 | SID12 | ... | SID1(M-1) | SID1M | | |
| | 2 | SID21 | SID22 | ... | SID2(M-1) | SID2M | | |
| | 3 | SID31 | SID32 | ... | SID3(M-1) | SID3M | | |
| | 4 | SID41 | SID42 | ... | SID4(M-1) | SID4M | | |
| | ... | ... | ... | ⋱ | ... | ... | | |
| | N-1 | SID(N-1)1 | SID(N-1)2 | ... | SID(N-1)(M-1) | SID(N-1)M | | |
| | N | SIDN1 | SIDN2 | ... | SIDN(M-1) | SIDNM | | |

WIRELESS COMMUNICATION SYSTEM, SLAVE WIRELESS DEVICE AND MASTER WIRELESS DEVICE

TECHNICAL FIELD

The present invention relates to: a wireless communication system including a master wireless device and a plurality of slave wireless devices, the plurality of slave wireless devices being provided to a certain appliance and being capable of wireless communication with the master wireless device; the slave wireless device capable of wireless communication with the master wireless device; and the master wireless device capable of wireless communication with the plurality of slave wireless devices.

BACKGROUND ART

Japanese Laid-Open Patent Publication No. 2017-188868 discloses a wireless communication system that, by a plurality of slave wireless devices being provided to a plurality of appliances disposed in a communication range of a master wireless device, is capable of wireless communication between the master wireless device and the plurality of slave wireless devices.

SUMMARY OF INVENTION

In the above-described publication, a configuration is adopted such that a specific master wireless device and the plurality of slave wireless devices are wirelessly connected. Therefore, if, due to movement of the appliance, the slave wireless device deviates from the communication range of the master wireless device, it becomes impossible to perform wireless communication between the specific master wireless device and the slave wireless device that has deviated from the communication range. Moreover, even if this slave wireless device enters the communication range of another master wireless device, the slave wireless device that has entered the communication range and the other master wireless device cannot be wirelessly connected.

The present invention, which has been made considering such a problem, has an object of providing a wireless communication system, a slave wireless device, and a master wireless device that enable wireless communication to be performed between the slave wireless device and the master wireless device even when an appliance moves.

A wireless communication system according to the present invention is a wireless communication system including: a master wireless device; and a plurality of slave wireless devices that are provided to a plurality of appliances and are capable of wireless communication with the master wireless device. The plurality of appliances are movable. A plurality of the master wireless devices each include a master control unit and a master communication unit. The plurality of slave wireless devices each include a slave control unit and a slave communication unit. In this case, the master control unit of the master wireless device wirelessly connected to the slave wireless device transmits to the slave communication unit of the slave wireless device via the master communication unit a cut-off request signal for requesting cut-off of a wireless connection, with respect to the slave wireless device deviating from a predetermined communication-target region of the master wireless device. Moreover, the slave control unit of the slave wireless device cuts off the wireless connection in the case that the slave communication unit has received the cut-off request signal.

Thus, the slave wireless device deviating from the communication-target region attains a connection-free state. As a result, it becomes possible, in the case where the slave wireless device has entered the communication-target region of another master wireless device, for the slave wireless device and the other master wireless device to be wirelessly connected. Hence, in the present invention, it becomes possible for wireless communication to be performed between the slave wireless device and the other master wireless device even when the appliance moves.

Moreover, the master control unit transmits to the slave communication unit of the slave wireless device via the master communication unit a connection request signal for requesting the wireless connection, with respect to the slave wireless device that has entered the communication-target region. The slave control unit of the slave wireless device performs the wireless connection in the case that the slave communication unit has received the connection request signal. As a result, the slave wireless device in the connection-free state and the master wireless device can be easily wirelessly connected.

Furthermore, the slave control unit is capable of transmitting to the master communication unit via the slave communication unit a connection completion signal to the effect that the wireless connection has been completed and a reception completion signal to the effect that the cut-off request signal has been received. The master control unit can recognize cut-off of the wireless connection to have been performed in the case that the reception completion signal is received, or that, for a fixed time, there is no response to the master communication unit from the slave communication unit.

Further still, one bank may be configured by a plurality of the slave wireless devices provided to a plurality of the appliances. In this case, each of a plurality of the slave wireless devices further includes a slave-side table storing at least an identification number of the bank to which the slave wireless device itself belongs, and identification numbers of a plurality of the master wireless devices. In addition, each of a plurality of the master wireless devices further includes a master-side table storing at least identification numbers of a plurality of the banks, and an identification number of the master wireless device itself. Moreover, the master control unit transmits to the slave communication units of a plurality of the slave wireless devices belonging to one of the banks that has entered the communication-target region, via the master communication unit, the connection request signal including the identification number of the one of the banks and the identification number of the master control unit itself, referring to the master-side table. In response to this, the slave control unit may perform the wireless connection in the case that the identification number of the one of the banks included in the connection request signal that has been received by the slave communication unit and the identification number of the bank to which the slave control unit itself belongs match, and that the identification number of the master wireless device included in the connection request signal is stored in the slave-side table, referring to the slave-side table.

Thus, pairing of each of a plurality of the master wireless devices and one of the banks is performed using data files like the master-side table and the slave-side table. As a result, the wireless connection can be performed accurately and efficiently. Moreover, if, at a time of replacing the master wireless device that has broken down with a new master wireless device, the identification numbers stored in the slave-side table are each transmitted to the new master wireless device from a plurality of the slave wireless devices configuring the one of the banks, then the identification numbers can each be copied to the master-side table of the new master wireless device. Thus, repair work of the wireless communication system becomes easy.

Moreover, the wireless communication system may further include a computer connected to a plurality of the master wireless devices. In this case, the computer outputs an instruction signal instructing the wireless connection or cut-off of the wireless connection with one of the slave wireless devices, to a plurality of the master wireless devices. The master control unit transmits to the slave communication unit via the master communication unit the connection request signal or the cut-off request signal, in the case that the instruction signal has been inputted from the computer. Moreover, the master control unit may output to the computer a completion notification signal for notifying completion of the wireless connection or completion of cut-off of the wireless connection, in the case that a connection completion signal to the effect that the wireless connection has been completed, or a reception completion signal to the effect that the cut-off request signal has been received is received by the master communication unit via the slave communication unit from the slave control unit, or that, for a fixed time, there is no response to the master communication unit from the slave communication unit.

As a result, the computer can easily confirm completion of the wireless connection or completion of cut-off of the wireless connection, based on the completion notification signal that has been inputted.

Moreover, a slave wireless device according to the present invention is a slave wireless device provided to a certain appliance and capable of wireless communication with a master wireless device, wherein the appliance is movable. In this case, the slave wireless device includes a slave control unit and a slave communication unit. The slave control unit cuts off a wireless connection with the master wireless device in the case that the slave communication unit has received a cut-off request signal from the master wireless device.

Thus, the slave wireless device attains the connection-free state. As a result, it becomes possible, in the case where the slave wireless device has deviated from the communication-target region of the master wireless device to enter the communication-target region of another master wireless device, for the slave wireless device to be wirelessly connected to the other master wireless device. Hence, in the present invention, it becomes possible for wireless communication to be performed between the slave wireless device and the other master wireless device even when the appliance moves.

Moreover, the slave control unit may perform the wireless connection in the case that the slave communication unit has received the connection request signal from the master wireless device. As a result, the slave wireless device in the connection-free state and the master wireless device can be easily wirelessly connected.

Furthermore, a master wireless device according to the present invention is a master wireless device capable of wireless communication with a plurality of slave wireless devices that are provided to a plurality of appliances, wherein a plurality of the appliances are movable. In this case, the master wireless device includes a master control unit and a master communication unit. In the case that the slave wireless device wirelessly connected to the master wireless device deviates from a predetermined communication-target region of the master wireless device, the master control unit transmits to the slave wireless device via the master communication unit a cut-off request signal for requesting the slave wireless device to cut-off a wireless connection.

Thus, the slave wireless device cuts off the wireless connection, and attains the connection-free state. As a result, it becomes possible, in the case where the slave wireless device has deviated from the communication-target region to enter the communication-target region of another master wireless device, for the slave wireless device to be wirelessly connected to the other master wireless device. Hence, in the present invention, it becomes possible for wireless communication to be performed between the slave wireless device and the other master wireless device even when the appliance moves.

Moreover, with respect to the slave wireless device that has entered the communication-target region, the master control unit may transmit to the slave wireless device via the master communication unit a connection request signal for requesting the wireless connection. As a result, the slave wireless device in the connection-free state and the master wireless device can be easily wirelessly connected.

DESCRIPTION OF EMBODIMENTS

A preferred embodiment of a wireless communication system, a slave wireless device, and a master wireless device according to the present invention will be described in detail below with reference to the accompanying drawings.

1. Configuration of Present Embodiment

Figure 1:
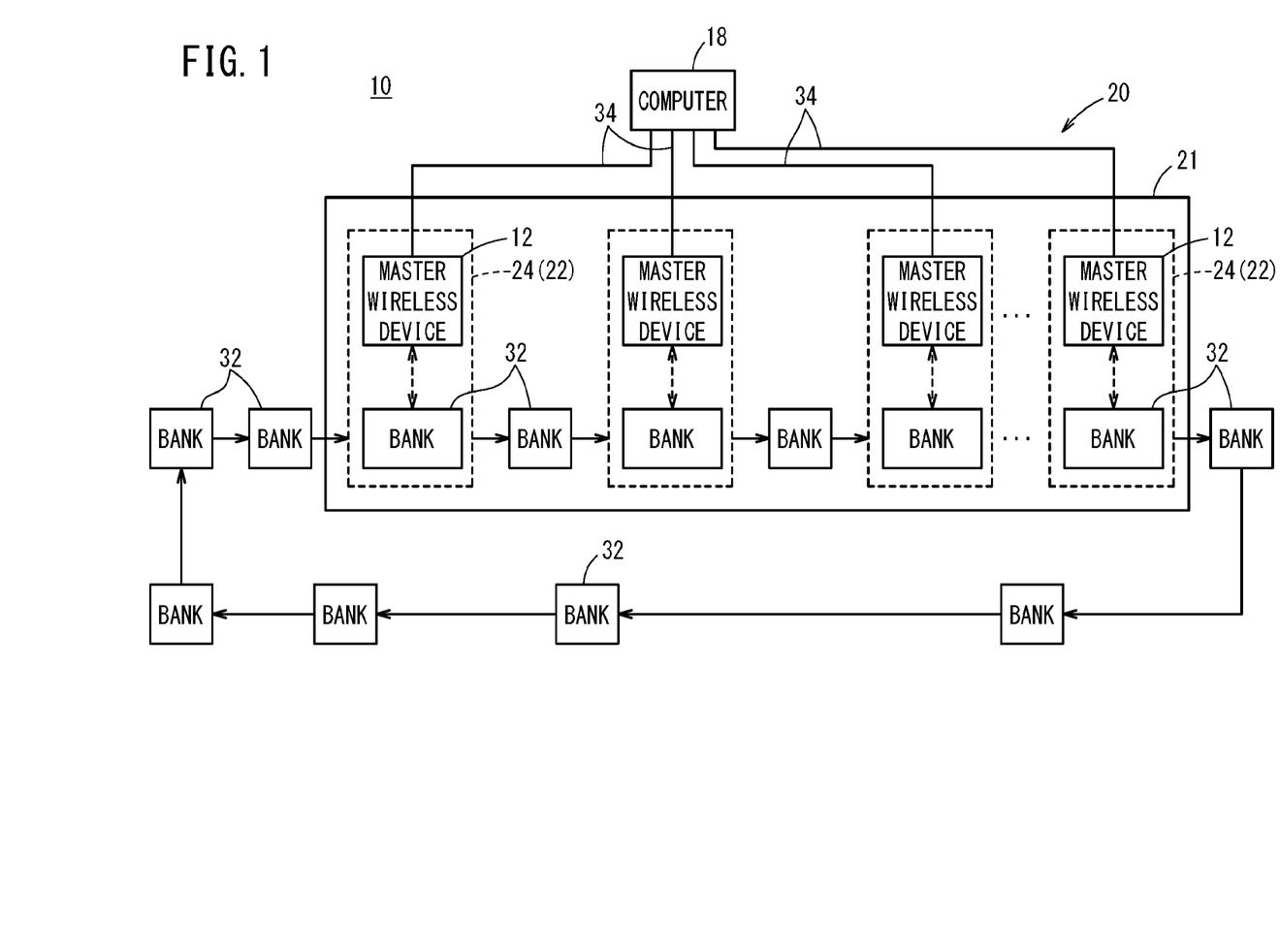
FIG. 1 is a schematic configuration diagram of a wireless communication system according to the present embodiment.
Figure 2:
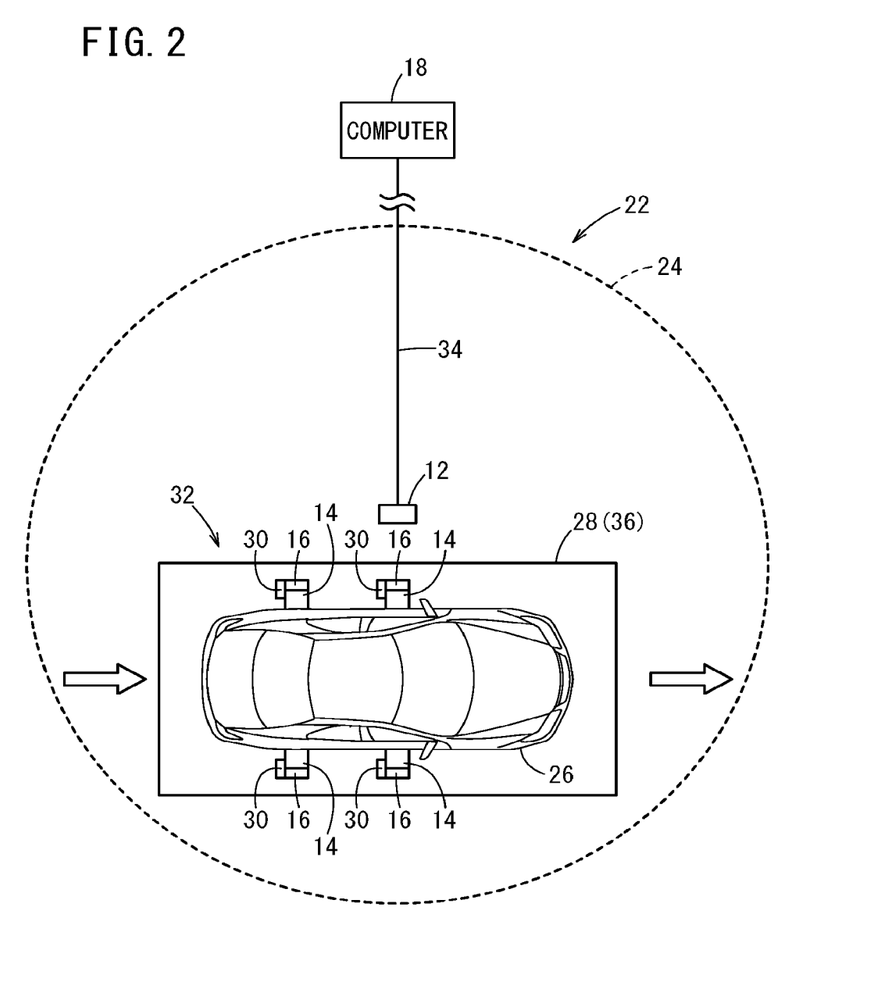
FIG. 2 is an explanatory diagram showing the case where there is one bank in a communication-target region of one master wireless device.
Figure 3:
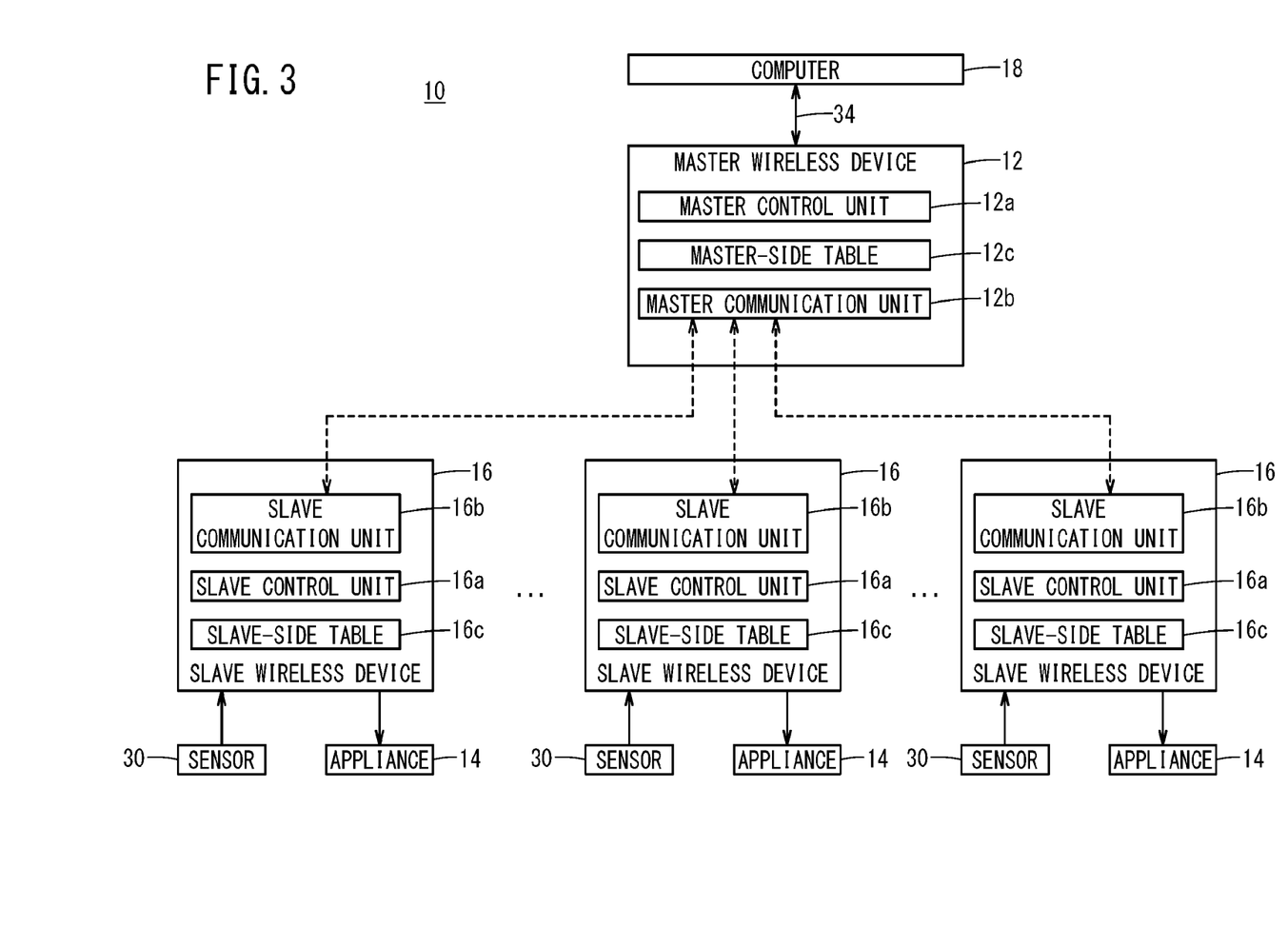
FIG. 3 is a block diagram showing a connection relationship of a computer, the master wireless device, and a plurality of slave wireless devices.

As shown in FIGS. 1 to 3, a wireless communication system 10 according to the present embodiment includes: a plurality of master wireless devices 12; a plurality of slave wireless devices 16 provided to a plurality of appliances 14, the plurality of slave wireless devices 16 configuring a later-mentioned plurality of banks 32 and being capable of wireless communication between themselves and one master wireless device 12; and a computer 18 connected to the plurality of master wireless devices 12.

FIGS. 1 and 2 illustrate an example where the wireless communication system 10 has been applied to wireless communication in an industrial facility. In this example, the wireless communication system 10 is applied to a conveyor line 20 of an automobile production plant. In this case, the conveyor line 20 is provided with a working area 21, and this working area 21 has provided thereto, sequentially, along a conveying direction of a later-mentioned carriage 28 (a clockwise direction shown in FIG. 1), a plurality of stations 22 for doing certain work. Each of the plurality of stations 22 has installed therein one master wireless device 12, and has installed therein at certain positions an unillustrated plurality of industrial robots for doing certain work. Each of these industrial robots also has connected thereto a wireless device capable of wireless communication with the one master wireless device 12.

Note that in the present embodiment, the number of the plurality of stations 22 and the plurality of master wireless devices 12 is assumed to be L (where L is an integer of 1 or more). Moreover, although the master wireless device 12 has a certain communication range, a region within the station 22 where the master wireless device 12 is installed, of this communication range is set to a communication-target region 24 for performing wireless communication between the master wireless device 12 and the plurality of slave wireless devices 16 configuring one bank 32. Hence, even if parts of the communication ranges overlap between the master wireless devices 12 of adjacent stations 22, communication-target regions 24 never overlap.

In the conveyor line 20, the plurality of carriages 28 each being an appliance for movement on which an automobile 26 (refer to FIG. 2) prior to completion is placed, are conveyed sequentially along the conveying direction. In the plurality of carriages 28, a periphery of the automobile 26 has disposed therein a plurality of the appliances 14 of the likes of a clamp cylinder for clamping an automobile component, such as a door of the automobile 26. Each of the plurality of appliances 14 is provided with the slave wireless device 16 and various kinds of sensors 30 for detecting a state of the appliance 14 being a measurement target. Hence, one carriage 28 is provided with a plurality of the appliances 14, a plurality of the slave wireless devices 16, and a plurality of the sensors 30. Moreover, by the carriage 28 being conveyed in the conveying direction, the plurality of appliances 14, the plurality of slave wireless devices 16, and the plurality of sensors 30 move integrally with the carriage 28.

The plurality of slave wireless devices 16 disposed in the carriage 28 configure one bank 32. Therefore, by the carriage 28 moving, the bank 32 also moves (refer to FIG. 1). For convenience of explanation, FIG. 1 illustrates a situation of the banks 32 moving along the conveying direction.

As shown in FIGS. 1 and 2, when the carriage 28 is conveyed to one station 22 along the conveyor line 20, the bank 32 provided to the carriage 28 enters the communication-target region 24 of the master wireless device 12 disposed in said station 22. As a result, wireless communication is performed between the master wireless device 12 and the plurality of slave wireless devices 16 configuring the bank 32.

Moreover, in said station 22, when, after certain work has been done on the automobile 26 placed on the carriage 28, the carriage 28 is conveyed from this station 22 toward the next station 22 on a downstream side, it results in the bank 32 deviating from the communication-target region 24. In this case, cut-off processing of a wireless connection is performed between the master wireless device 12 and the plurality of slave wireless devices 16 configuring the bank 32. Hence, the plurality of slave wireless devices 16 after the wireless connection has been cut off attain a connection-free state.

Therefore, in the present embodiment, in each of the plurality of stations 22, wireless communication is performed between one master wireless device 12 and the plurality of slave wireless devices 16 configuring one bank 32, only when the one bank 32 is in the communication-target region 24 of the one master wireless device 12.

Moreover, in the present embodiment too, similarly to in the above-described publication, wireless communication is performed by a frequency hopping system, between one master wireless device 12 and a plurality of slave wireless devices 16. That is, in the master wireless device 12, in order that, after cut-off of the wireless connection, wireless communication can be performed between the master wireless device 12 and the plurality of slave wireless devices 16 of the next bank 32, the master wireless device 12 is switched to a channel of a synchronizing frequency differing from a synchronizing frequency of the bank 32 that has deviated from the communication-target region 24. On the other hand, in order that wireless communication can be performed between the plurality of slave wireless devices 16 in the connection-free state and the next master wireless device 12, the plurality of slave wireless devices 16 are switched to a channel of a synchronizing frequency differing from the synchronizing frequency in the previous wireless connection. Switching of channels by the frequency hopping system is disclosed in the above-described publication, so a detailed description thereof will be omitted.

Note that in the present embodiment, in one carriage 28, the number of the plurality of slave wireless devices 16 configuring one bank 32 is assumed to be M (where M is an integer of 1 or more). Moreover, in the present embodiment, the number of banks 32 (the number of carriages 28) is assumed to be N.

FIG. 3 is a block diagram showing, with respect to one station 22, a connection relationship of: the computer 18; the master wireless device 12; and the plurality of slave wireless devices 16 configuring the bank 32. Note that the plurality of slave wireless devices 16 configuring the bank 32 have the same configurations as each other. Moreover, the master wireless devices 12 disposed in each of the plurality of stations 22 have the same configurations as each other.

The computer 18 and the master wireless device 12 are connected via a communication line 34 such as a field bus, and are capable of transmission/reception of signals. The computer 18, which is a PLC (Programmable Logic Controller) or a PC (Personal Computer), for example, performs at least monitoring of the industrial facility (the conveyor line 20 of the automobile production plant). The computer 18 outputs various kinds of instructions (for example, an instruction signal, a control instruction signal) to the master wireless device 12 via the communication line 34. In addition, the computer 18 is inputted with various kinds of responses to the instructions (for example, a completion notification signal) from the master wireless device 12. Furthermore, the computer 18 monitors the wireless communication system 10 overall. For example, by the computer 18 having bank IDs being identification numbers of a plurality of the banks 32, it is possible for the computer 18 to recognize a current position of each of the banks 32 or a state of the wireless connection with each of the banks (the plurality of slave wireless devices 16) and the master wireless device 12, based on response content inputted from the master wireless device 12.

The master wireless device 12 includes a master control unit 12a, a master communication unit 12b, and a master-side table 12c. The master control unit 12a controls the whole of the master wireless device 12, and performs transmission/reception of signals by wireless communication, between the master wireless device 12 and the slave wireless device 16 in the communication-target region 24 of the master wireless device 12, via the master communication unit 12b.

In addition, the master control unit 12a transmits to the slave wireless device 16 in the communication-target region 24 via the master communication unit 12b a connection request signal for requesting the wireless connection or a cut-off request signal for requesting cut-off of the wireless connection, based on the instruction signal inputted from the computer 18. Furthermore, the master control unit 12a outputs to the computer 18 the completion notification signal for notifying completion of the wireless connection or completion of cut-off of the wireless connection, in the case that the master communication unit 12b has received from the slave wireless device 16 a connection completion signal to the effect that the wireless connection has been completed, or a reception completion signal to the effect that the cut-off request signal has been received. Moreover, the master control unit 12a may output to the computer 18 the completion notification signal, in the case that, for a fixed time, there is no response to the master communication unit 12b from the slave wireless device 16, instead of by reception of the reception completion signal. Thus, the master control unit 12a outputs the completion notification signal, recognizing cut-off of the wireless connection to have been performed, in the case that the master control unit 12a has received the reception completion signal, or in the case that, for a fixed time, there is no response to the master control unit 12a from the slave wireless device 16.

The slave wireless device 16 includes a slave control unit 16a, a slave communication unit 16b, and a slave-side table 16c. The slave control unit 16a controls the whole of the slave wireless device 16, and performs transmission/reception of signals by wireless communication, between the slave wireless device 16 and the master wireless device 12, via the slave communication unit 16b. In this case, the slave control unit 16a supplies the appliance 14 with the control instruction signal from the master wireless device 12 received by the slave communication unit 16b, thereby operating the appliance 14, and, at the same time, transmits to the master wireless device 12 via the slave communication unit 16b a detection signal indicating a state of the appliance 14 detected by the sensor 30.

In addition, the slave control unit 16a transmits the connection completion signal to the master communication unit 12b via the slave communication unit 16b after having performed the wireless connection with the master wireless device 12, in the case that the slave communication unit 16b has received the connection request signal. Furthermore, the slave control unit 16a performs cut-off of the wireless connection with the master wireless device 12 after having transmitted the reception completion signal to the master communication unit 12b via the slave communication unit 16b, in the case that the slave communication unit 16b has received the cut-off request signal.

Figure 4:
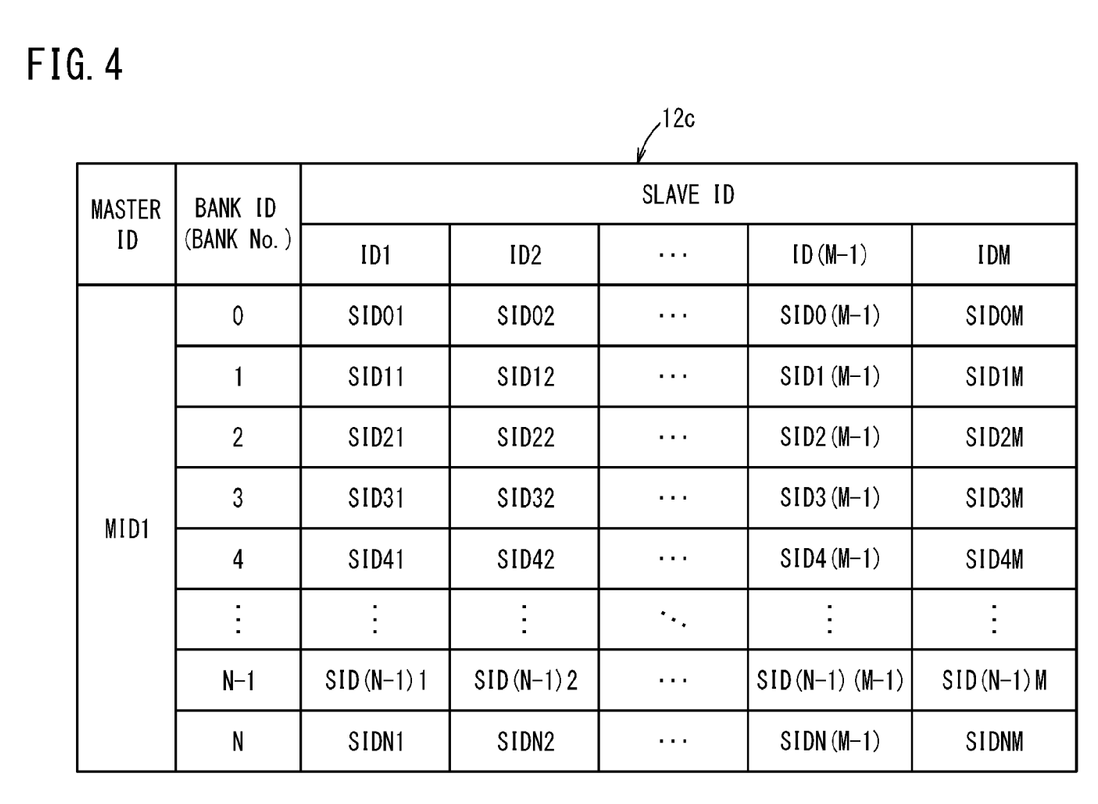
FIG. 4 is a view showing a master-side table of FIG. 3.
Figure 5:
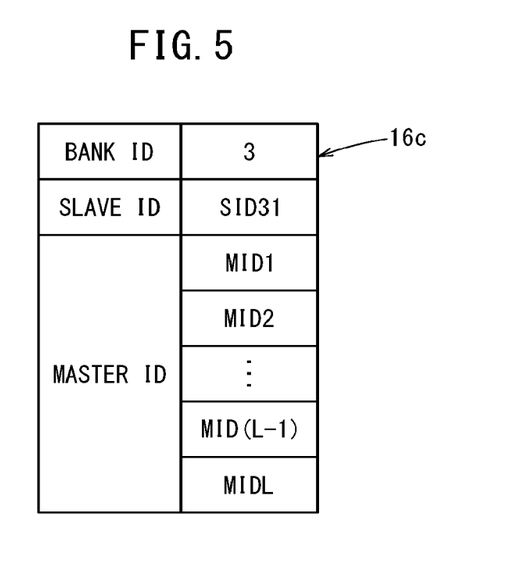
FIG. 5 is a view showing a slave-side table of FIG. 3.

FIG. 4 is a view showing various kinds of identification numbers (IDs) stored in the master-side table 12c, and FIG. 5 is a view showing various kinds of IDs stored in the slave-side table 16c.

The master-side table 12c has stored therein: a master ID being an identification number of the master-side table 12c itself; bank IDs being identification numbers of a plurality of the banks 32; and slave IDs being identification numbers of the pluralities of slave wireless devices 16 configuring the plurality of banks 32. In FIG. 4, it is illustrated that a master ID of "MIDI" indicating being the first master wireless device 12, and bank IDs from 0 to N, are stored in the master-side table 12c. Moreover, in FIG. 4, there are also stored slave IDs of "SIDij" (where i is an integer from 0 to N, and j is an integer from 1 to M) indicating the pluralities of slave wireless devices 16 configuring the banks 32. Note that in the present embodiment, at the same time as there being present the plurality of banks 32 having bank IDs of "1 to N", the bank 32 having a bank ID of "0" is prepared as a spare bank for future expansion.

The slave-side table 16c has stored therein: the bank ID of the bank 32 to which the slave-side table 16c itself belongs; a slave ID being the identification number of the slave-side table 16c itself; and the master IDs of a plurality of the master wireless devices 12. In FIG. 5, it is illustrated that a bank ID of "3" indicating being the third bank 32, a slave ID of "SID31", and master IDs of "MIDk" (where k is an integer from 1 to L), are stored in the slave-side table 16c.

Hence, the master control unit 12a transmits to the slave communication unit 16b via the master communication unit 12b the connection request signal including one bank ID, one slave ID, and the master ID of the master control unit 12a itself, referring to the master-side table 12c of FIG. 4. The slave control unit 16a performs the wireless connection if the bank ID included in the connection request signal received by the slave communication unit 16b and the bank ID to which the slave control unit 16a itself belongs match, the slave ID included in the connection request signal and the slave ID of the slave control unit 16a itself match, and the master ID included in the connection request signal is stored in the slave-side table 16c of FIG. 5, referring to the slave-side table 16c.

On the other hand, the slave control unit 16a transmits to the master communication unit 12b via the slave communication unit 16b the connection completion signal including the bank ID to which the slave control unit 16a itself belongs, the slave ID of the slave control unit 16a itself, and the master ID of the master wireless device 12 being a wireless connection target, referring to the slave-side table 16c. The master control unit 12a recognizes the wireless connection to have been completed if the bank ID and the slave ID included in the connection completion signal received by the master communication unit 12b are stored in the master-side table 12c, and the master ID included in the connection completion signal and the master ID of the master control unit 12a itself match, referring to the master-side table 12c.

Therefore, the number of the banks 32 (bank IDs) or the number of the plurality of slave wireless devices 16 within the banks 32 (slave IDs) can be increased/decreased depending on a magnitude of capacity of the master-side table 12c. Moreover, the number of the master wireless devices 12 (master IDs) can be increased/decreased depending on a magnitude of capacity of the slave-side table 16c.

2. Operation of Present Embodiment

Operation of the wireless communication system 10, the master wireless device 12, and the slave wireless device 16 according to the present embodiment configured as above, will be described with reference to the sequence diagrams of FIGS. 6 to 8. In this operation description, description will be made with reference also to FIGS. 1 to 5, as required.

In this operation description, operation from one carriage 28 being conveyed to one station 22 whereby one bank 32 enters the communication-target region 24 of the master wireless device 12 to the bank 32 departing from the communication-target region 24 due to movement of the carriage 28, will be described. Note that this operation is performed similarly for all of the stations 22 shown in FIG. 1.

Figure 6:
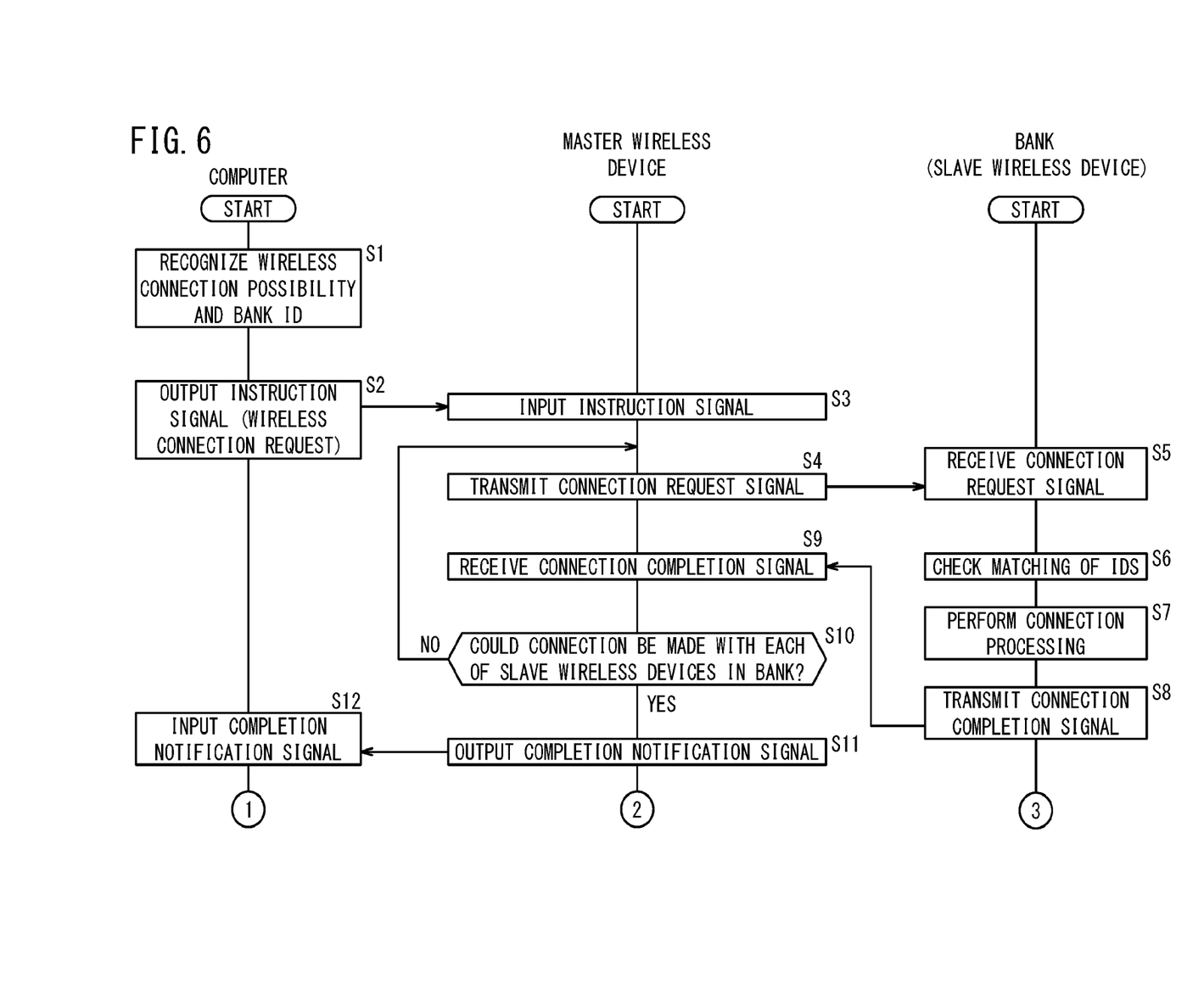
FIG. 6 is a sequence diagram showing a flow of wireless connection processing with the master wireless device and the slave wireless device.

<2.1 Operation of FIG. 6 (Operation of Wireless Connection)>

As previously mentioned, the computer 18 has the bank IDs, and is capable of monitoring all of the banks 32, based on information inputted from the plurality of master wireless devices 12. Therefore, in step S1, the computer 18 recognizes, with regard to the carriage 28 conveyed to one station 22 (refer to FIGS. 1 and 2), that the plurality of slave wireless devices 16 configuring the bank 32 are in the connection-free state and that the master wireless device 12 provided to said station 22 is also in an unconnected state. In addition, the computer 18 grasps the bank ID of the bank 32 entering the communication-target region 24 of this station 22, and, by the bank 32 entering the communication-target region 24, judges that wireless communication is possible between the master wireless device 12 and the plurality of slave wireless devices 16 configuring the bank 32. Note that in the present embodiment, wireless communication by the frequency hopping system is performed, so the master wireless device 12, and the plurality of slave wireless devices 16 configuring the bank 32 have each undergone switching of their channel of synchronizing frequency in advance.

In following step S2, the computer 18 outputs to the master wireless device 12 the instruction signal for instructing request of the wireless connection between the master wireless device 12 and the plurality of slave wireless devices 16 configuring the bank 32. In this case, the computer 18 outputs to the master wireless device 12 the instruction signal including the bank ID of said bank 32.

If the instruction signal has been inputted in step S3, then in following step S4, the master control unit 12a (refer to FIG. 3) of the master wireless device 12 recognizes the bank ID indicated by the instruction signal. Next, the master control unit 12a generates the connection request signal including the bank ID, one slave ID, and the master ID of the master control unit 12a itself, referring to the master-side table 12c, and transmits the generated connection request signal to the communication-target region 24 via the master communication unit 12b.

Now, if the carriage 28 has been conveyed to the station 22, and the bank 32 has entered the communication-target region 24, then in step S5, the slave communication units 16b of the plurality of slave wireless devices 16 belonging to the bank 32 receive the connection request signal from the master communication unit 12b.

Then, in step S6, the slave control units 16a of the plurality of slave wireless devices 16 judge, referring to the slave-side table 16c, whether or not the bank ID included in the connection request signal and the bank ID of the bank 32 to which the slave control unit 16a itself belongs match, the slave ID included in the connection request signal and the slave ID of the slave control unit 16a itself match, and the master ID included in the connection request signal is stored in the slave-side table 16c.

If, as a result, each of the IDs match, then in following step S7, the slave control unit 16a recognizes the wireless connection to have been requested of the slave wireless device 16 in which the slave control unit 16a itself is included, and performs wireless connection processing between the slave wireless device 16 and the master wireless device 12 indicated by the master ID. Subsequently, in step S8, the slave control unit 16a generates the connection completion signal including the bank ID to which the slave control unit 16a itself belongs, the slave ID of the slave control unit 16a itself, and the master ID of the master wireless device 12 that has transmitted the connection request signal, referring to the slave-side table 16c, and transmits the generated connection completion signal to the master communication unit 12b via the slave communication unit 16b. Note that if, in step S6, each of the IDs do not match, then the slave control unit 16a waits until the slave wireless device 16 receives a connection request signal in which the IDs match.

In step S9, if the master communication unit 12b has received the connection completion signal, then the master control unit 12a recognizes the wireless connection between the master wireless device 12 and the slave wireless device 16 indicated by the slave ID to have been completed if the bank ID and the slave ID included in the connection completion signal are stored in the master-side table 12c, and the master ID included in the connection completion signal and the master ID of the master control unit 12a itself match, referring to the master-side table 12c.

In following step S10, the master control unit 12a judges whether or not the wireless connection between the master wireless device 12 and all of the slave wireless devices 16 within the bank 32 has been completed. If the wireless connection between the master wireless device 12 and all of the slave wireless devices 16 has not been completed, that is, if the connection completion signal has not been received from all of the slave wireless devices 16 (step S10: NO), then processing returns to step S4, and the connection request signal is retransmitted targeting the slave wireless device 16 from which the connection completion signal has not been received. Thus, processing of steps S4 to S10 is repeatedly performed until the wireless connection between the master wireless device 12 and all of the slave wireless devices 16 within the bank 32 has been completed.

In step S10, if the wireless connection between the master wireless device 12 and all of the slave wireless devices 16 within the bank 32 has been completed (step S10: YES), then in following step S11, the master control unit 12a outputs to the computer 18 the completion notification signal indicating that the wireless connection between the master wireless device 12 and all of the slave wireless devices 16 configuring the bank 32 has been completed. In step S12, the computer 18 can recognize that the wireless connection between the plurality of slave wireless devices 16 configuring the bank 32 and the master wireless device 12 has been completed, and that a situation enabling wireless communication has been attained, based on input of the completion notification signal.

Figure 7:
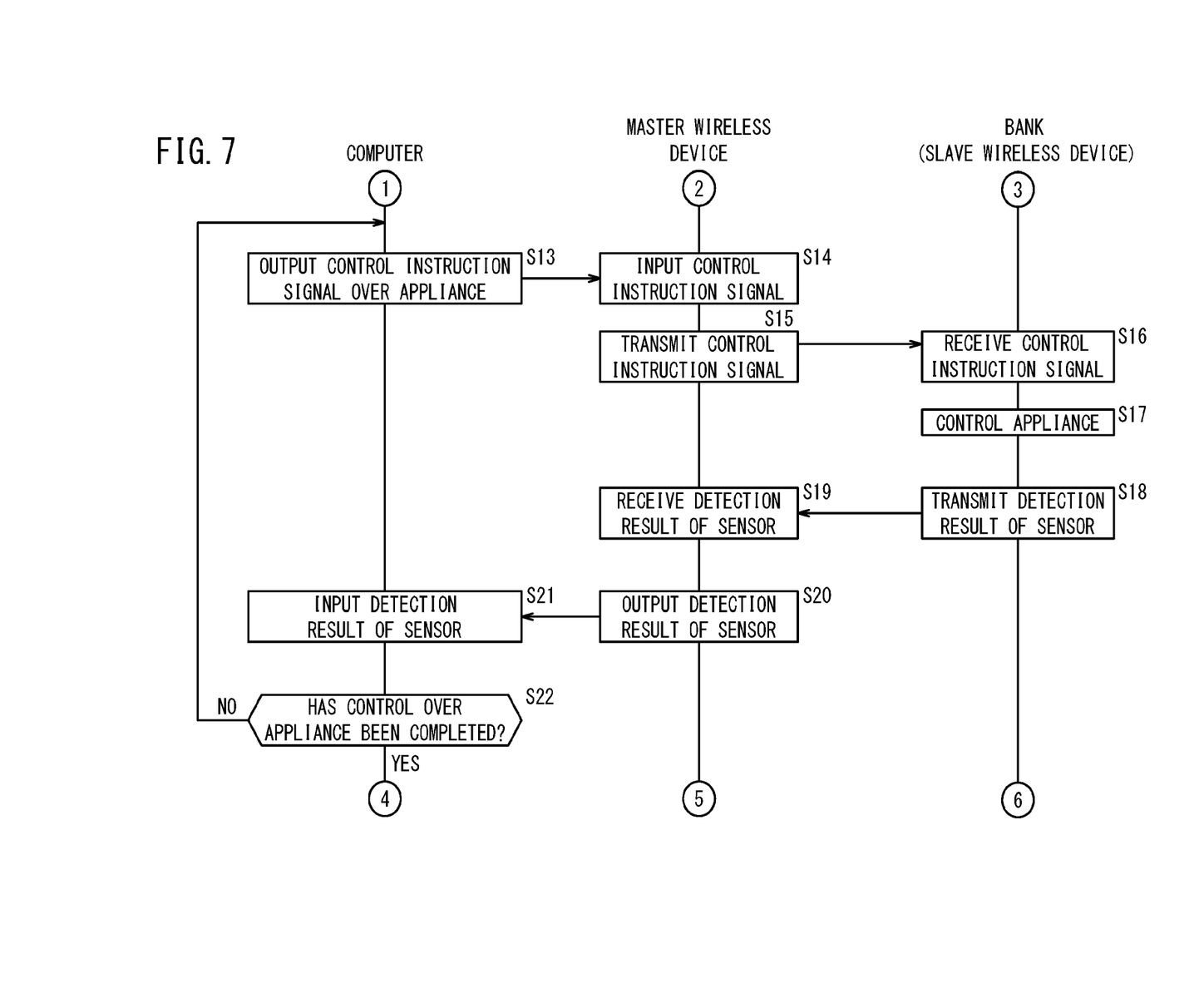
FIG. 7 is a sequence diagram showing a flow of control processing over an appliance from the computer.

<2.2 Operation of FIG. 7 (Control Operation over Appliance 14>

In step S13 of FIG. 7, the computer 18 outputs to the master wireless device 12 the control instruction signal for instructing control over the appliance 14. If the control instruction signal has been inputted in step S14, then in following step S15, the master control unit 12a transmits the control instruction signal, via the master communication unit 12b, to the slave communication unit 16b provided to the appliance 14 being a control target.

If the control instruction signal has been received by the slave communication unit 16b in step S16, then in following step S17, the slave control unit 16a supplies the received control instruction signal to the appliance 14, and thereby operates the appliance 14. At the same time, the sensor 30 detects an operation state of the appliance 14, and outputs a detection signal thereof to the slave wireless device 16. In step S18, the slave control unit 16a transmits the detection signal of the sensor 30 to the master communication unit 12b via the slave communication unit 16b.

If the detection signal has been received by the master communication unit 12b in step S19, then in following step S20, the master control unit 12a outputs to the computer 18 the detection signal received by the master communication unit 12b. In step S21, the computer 18 can recognize the state of the appliance 14 being the control target, based on input of the detection signal.

In following step S22, the computer 18 judges whether or not control over all of the appliances 14 disposed in the one carriage 28 should be completed. If control over all of the appliances 14 has not been completed (step S22: NO), then the computer 18 returns to step S13, and performs output of the control instruction signal to the same appliance 14 or another appliance 14. Repeatedly performing processing of steps S13 to S22 in this way makes it possible for the certain work on the automobile 26 placed on the carriage 28 to be done in one station 22.

Note that in steps S13 to S22, the computer 18 transmits the control instruction signal to the wireless device of the industrial robot installed in the communication-target region 24 of the station 22, via the master wireless device 12. As a result, the industrial robot can do the certain work on the automobile 26 placed on the carriage 28, based on the control instruction signal supplied via the wireless device. In this case, the master wireless device 12 should utilize technology of the above-described publication to perform wireless communication between itself and the wireless device provided to the industrial robot. Moreover, in steps S13 to S22, the master wireless device 12 may utilize technology of the above-described publication to perform wireless communication between itself and the slave wireless device 16.

Figure 8:
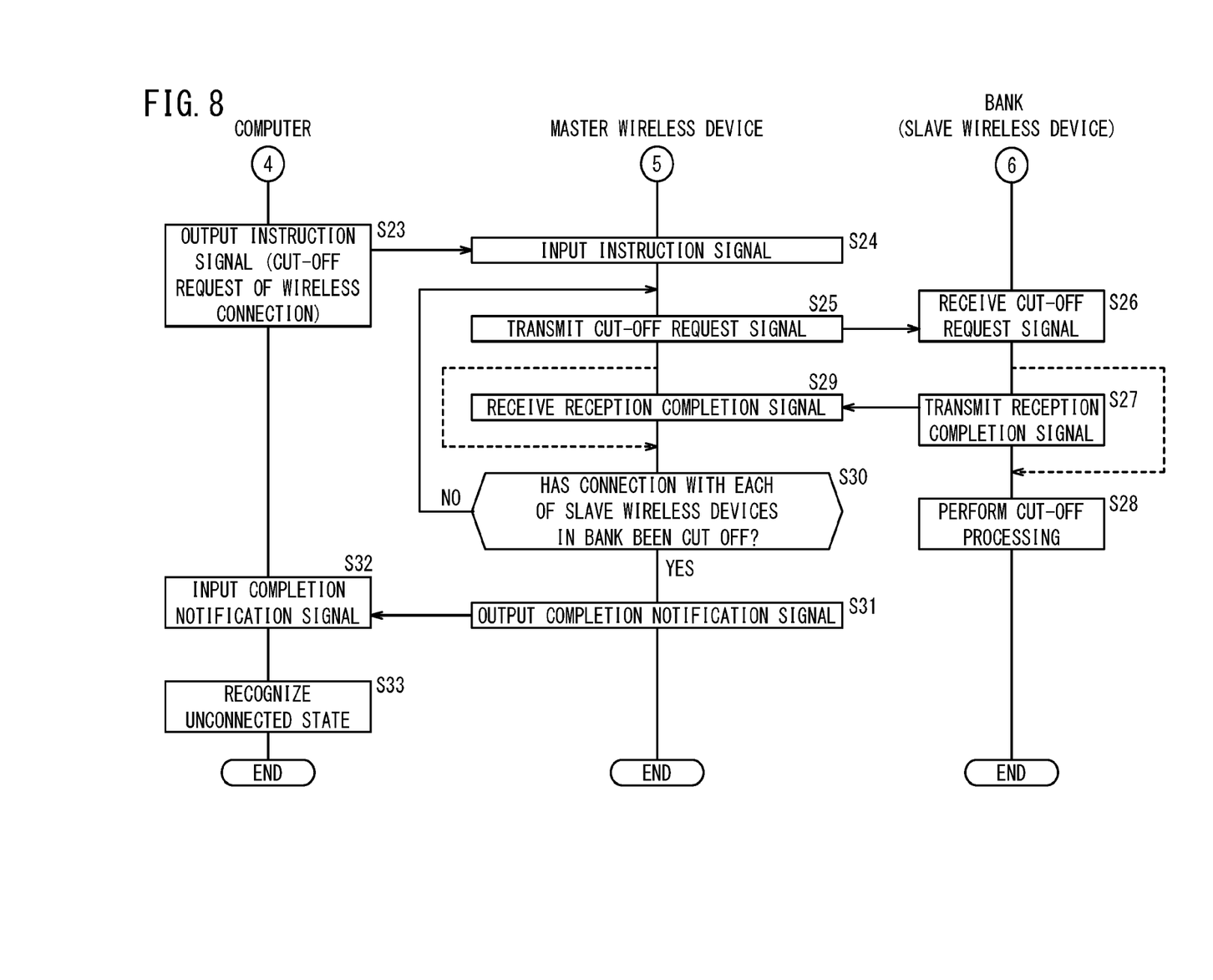
FIG. 8 is a sequence diagram showing a flow of cut-off processing of a wireless connection with the master wireless device and the slave wireless device.

<2.3 Operation of FIG. 8 (Cut-Off Operation of Wireless Connection)>

If the certain work on the automobile 26 have been completed, and control over all of the appliances 14 has been completed (step S22 of FIG. 7: YES), then in step S23 of FIG. 8, the computer 18 outputs to the master wireless device 12 the instruction signal for instructing cut-off of the wireless connection between the master wireless device 12, and the plurality of slave wireless devices 16 configuring the bank 32.

If the instruction signal has been inputted in step S24, then in following step S25, the master control unit 12a generates the cut-off request signal, and transmits the generated cut-off request signal to the communication-target region 24 via the master communication unit 12b.

If, in step S26, the cut-off request signal has been received from the master communication unit 12b by the slave communication unit 16b of the plurality of slave wireless devices 16, then in step S27, the slave control unit 16a recognize cut-off of the wireless connection to have been requested of the slave wireless device 16 in which the slave control unit 16a itself is included. Then, the slave control unit 16a generates the reception completion signal to the effect that the cut-off request signal has been received, and transmits the generated reception completion signal to the master communication unit 12b via the slave communication unit 16b. Subsequently, in step S28, the slave control unit 16a performs cut-off of the wireless connection between the slave wireless device 16 and the master wireless device 12.

If, in step S29, the reception completion signal has been received by the master communication unit 12b, then the master control unit 12a recognizes cut-off processing of the wireless connection to have been performed in the slave wireless device 16 that has transmitted the reception completion signal. In following step S30, the master control unit 12a judges whether or not cut-off processing of the wireless connection between the master wireless device 12 and all of the slave wireless devices 16 within the bank 32 has been able to be recognized, that is, whether or not the reception completion signal has been received from all of the slave wireless devices 16. If cut-off of the wireless connection between the master wireless device 12 and all of the slave wireless devices 16 has not been able to be recognized, that is, if the reception completion signal has not been received from all of the slave wireless devices 16 (step S30: NO), then processing returns to step S25. Then, the master control unit 12a retransmits the cut-off request signal targeting the slave wireless device 16 from which the reception completion signal has not been received. Thus, processing of steps S25 to S30 is repeatedly performed until the reception completion signal is received from all of the slave wireless devices 16 within the bank 32.

If the reception completion signal has been received from all of the slave wireless devices 16 within the bank 32, and cut-off of the wireless connection between the master wireless device 12 and all of the slave wireless devices 16 has been able to be recognized by the master control unit 12a (step S30: YES), then in following step S31, the master control unit 12a outputs to the computer 18 the completion notification signal indicating cut-off of the wireless connection between the master wireless device 12 and all of the slave wireless devices 16 configuring the bank 32 to have been completed. Thus, by the wireless connection between the master wireless device 12 and the plurality of slave wireless devices 16 within the bank 32 being cut off, the master wireless device 12 attains the unconnected state, and the plurality of slave wireless devices 16 attain the connection-free state. Subsequently, switching of the channel of synchronizing frequency is performed in each of the master wireless device 12 and the plurality of slave wireless devices 16 that have attained the connection-free state.

If the completion notification signal has been inputted in step S32, then in following step S33, the computer 18 can recognize that cut-off of the wireless connection between the plurality of slave wireless devices 16 configuring the bank 32 and the master wireless device 12 has been completed, and that the master wireless device 12 and the plurality of slave wireless devices 16 have together attained the unconnected state, based on the completion notification signal. Note that since the certain work on the automobile 26 have been completed, the carriage 28 is conveyed toward the next station 22 on the downstream side, whereby the bank 32 departs from the communication-target region 24 with all of the slave wireless devices 16 in the connection-free state.

3. Modified Examples

In the present embodiment, a plurality of automatic guided vehicles (AGVs) 36 each being an appliance for movement on which the automobile 26 prior to completion is placed, may be moved in the conveying direction, instead of the plurality of carriages 28. In this case too, the bank 32 can be configured by the plurality of slave wireless devices 16 disposed in the automatic guided vehicle 36.

Moreover, in step S4 of FIG. 6, the master communication unit 12b of the master wireless device 12 may transmit the connection request signal including the bank ID and the master ID. Thus, the connection request signal can be transmitted simultaneously to the plurality of slave wireless devices 16 of the bank 32 that has entered the communication-target region 24 of the master wireless device 12. As a result, it becomes possible for the wireless connection between the master wireless device 12 and the plurality of slave wireless devices 16 to be promptly performed. In this case, the master-side table 12c and the slave-side table 16c may have stored therein at least the bank ID and the master ID.

Furthermore, in step S15 of FIG. 7, the master communication unit 12b of the master wireless device 12 may transmit the control instruction signal including the bank ID and the master ID, or the bank ID, the master ID, and the slave ID. As a result, the plurality of slave wireless devices 16 of the bank 32 that has entered the communication-target region 24 can perform ID match processing in step S17 in a manner similar to in step S6 of FIG. 6, and after having recognized the control instruction signal to be targeting the appliance 14 connected to the slave wireless device 16 itself, supply the control instruction signal to said appliance 14.

Further still, in step S18 of FIG. 7, the slave control unit 16a may supplement the detection signal of the sensor 30 with the bank ID, the master ID, and the slave ID, and transmit the supplemented detection signal to the master communication unit 12b via the slave communication unit 16b. As a result, the master control unit 12a can recognize that the detection signal as a response to the control instruction signal transmitted in step S15 has been able to be received, based on the bank ID, the master ID, and the slave ID that have been received by the master communication unit 12b.

Moreover, in step S25 of FIG. 8, the master communication unit 12b of the master wireless device 12 may transmit the cut-off request signal including the bank ID and the master ID, or the bank ID, the master ID, and the slave ID. As a result, the plurality of slave wireless devices 16 of the bank 32 that has entered the communication-target region 24 can perform ID match processing in step S27 in a manner similar to in step S6 of FIG. 6, and after having recognized the cut-off request signal to be targeting the slave wireless device 16 itself, perform cut-off processing of the wireless connection.

Furthermore, as shown by the broken lines of FIG. 8, the master control unit 12a may recognize cut-off of the wireless connection to have been performed by the slave wireless device 16 in the case that, for a fixed time, there is no response to the master communication unit 12b from said slave wireless device 16, instead of by transmission of the reception completion signal in step S27 and reception of the reception completion signal in step S29. Thus, if, in step S30, cut-off of the wireless connection has been recognized to have been performed for all of the slave wireless devices 16 (step S30: YES), then the master control unit 12a can output the completion notification signal to the computer 18 in step S31.

4. Advantages of Present Embodiment

As indicated above, in the wireless communication system 10 according to the present embodiment, the plurality of appliances 14, the carriage 28, and the automatic guided vehicle 36 are movable. The master control unit 12a of the master wireless device 12 wirelessly connected to the slave wireless device 16 provided to the appliance 14, the carriage 28, and the automatic guided vehicle 36 transmits the cut-off request signal to the slave communication unit 16b of the slave wireless device 16 via the master communication unit 12b, with respect to the slave wireless device 16 deviating from the communication-target region 24. The slave control unit 16a of the slave wireless device 16 cuts off the wireless connection in the case that the slave communication unit 16b has received the cut-off request signal.

Thus, the slave wireless device 16 deviating from the communication-target region 24 attains the connection-free state. As a result, it becomes possible, in the case where the slave wireless device 16 has entered the communication-target region 24 of another master wireless device 12, for the slave wireless device 16 and the other master wireless device 12 to be wirelessly connected. Hence, it becomes possible for wireless communication to be performed between the slave wireless device 16 and the other master wireless device 12 even when the appliance 14, the carriage 28, and the automatic guided vehicle 36 move.

Moreover, the master control unit 12a transmits the connection request signal to the slave communication unit 16b via the master communication unit 12b, with respect to the slave wireless device 16 that has entered the communication-target region 24. The slave control unit 16a performs the wireless connection in the case that the slave communication unit 16b has received the connection request signal. As a result, the slave wireless device 16 in the connection-free state and the master wireless device 12 can be easily wirelessly connected.

Furthermore, the slave control unit 16a transmits the connection completion signal and the reception completion signal to the master communication unit 12b via the slave communication unit 16b. As a result, the master control unit 12a can easily confirm completion of the wireless connection, and can easily recognize cut-off of the wireless connection to have been performed, based on the connection completion signal and the reception completion signal that have been received by the master communication unit 12b. In addition, the master control unit 12a may recognize cut-off of the wireless connection to have been performed in the case that, for a fixed time, there is no response to the master communication unit 12b from the slave communication unit 16b, instead of by reception of the reception completion signal by the master communication unit 12b.

In this way, cut-off of the wireless connection can be certainly recognized to have been performed, by reception of the reception completion signal. Moreover, it becomes possible, in the case that, for a fixed time, there is no response from the slave communication unit 16b, for it to be inferred on a master control unit 12a side that cut-off of the wireless connection has been performed by the slave wireless device 16, and that there has been a transition to the connection-free state.

Moreover, one bank 32 is configured by the plurality of slave wireless devices 16 provided to the plurality of appliances 14, the carriage 28, and the automatic guided vehicle 36. Each of the plurality of slave wireless devices 16 further includes the slave-side table 16c storing the bank ID of the bank 32 to which the slave wireless device 16 itself belongs, the master IDs of a plurality of the master wireless devices 12, and the slave ID of the slave wireless device 16 itself. Moreover, each of the plurality of master wireless devices 12 further includes the master-side table 12c storing the bank IDs of a plurality of the banks 32, the master ID of the master wireless device 12 itself, and the slave IDs of the pluralities of slave wireless devices 16 belonging to the plurality of banks 32. The master control unit 12a transmits to the slave communication units 16b of the plurality of slave wireless devices 16 belonging to one bank 32 that has entered the communication-target region 24, via the master communication unit 12b, the connection request signal including at least one bank ID and the master ID of the master control unit 12a itself, referring to the master-side table 12c. In response to this, the slave control unit 16a performs the wireless connection in the case that the bank ID included in the connection request signal that has been received by the slave communication unit 16b and the bank ID of the bank 32 to which the slave control unit 16a itself belongs match, and that the master ID included in the connection request signal is stored in the slave-side table 16c, referring to the slave-side table 16c.

Thus, pairing of each of the plurality of master wireless devices 12 and one bank 32 is performed using data files like the master-side table 12c and the slave-side table 16c. As a result, the wireless connection can be performed accurately and efficiently. Moreover, if, at a time of replacing the master wireless device 12 that has broken down with a new master wireless device 12, the IDs stored in the slave-side table 16c are each transmitted to the new master wireless device 12 from the plurality of slave wireless devices 16 configuring one bank 32, then the IDs can each be copied to the master-side table 12c of the new master wireless device 12. Thus, repair work of the wireless communication system 10 becomes easy.

Moreover, the computer 18 outputs the instruction signal to the plurality of master wireless devices 12. The master control unit 12a transmits to the slave communication unit 16b via the master communication unit 12b the connection request signal or the cut-off request signal, in the case that the master control unit 12a has been inputted with the instruction signal, and, on the other hand, outputs to the computer 18 the completion notification signal, in the case that the connection completion signal or the reception completion signal has been received by the master communication unit 12b. As a result, the computer 18 can easily confirm completion of the wireless connection or completion of cut-off of the wireless connection, based on the inputted completion notification signal. In this case too, the master control unit 12a may output the completion notification signal to the computer when, for a fixed time, there is no response to the master communication unit 12b from the slave communication unit 16b, instead of due to reception of the reception completion signal.

Moreover, due to the slave wireless device 16 according to the present embodiment, the slave control unit 16a cuts off the wireless connection with the master wireless device 12 in the case that the slave communication unit 16b has received the cut-off request signal from the master wireless device 12. Thus, the slave wireless device 16 attains the connection-free state. As a result, it becomes possible, in the case where the slave wireless device 16 has deviated from the communication-target region 24 of the master wireless device 12 to enter the communication-target region 24 of another master wireless device 12, for the slave wireless device 16 to be wirelessly connected to the other master wireless device 12. Hence, it becomes possible for wireless communication to be performed between the slave wireless device 16 and the other master wireless device 12 even when the appliance 14, the carriage 28, and the automatic guided vehicle 36 move.

In addition, the slave control unit 16a performs the wireless connection in the case that the slave communication unit 16b has received the connection request signal from the master wireless device 12. As a result, the slave wireless device 16 in the connection-free state and the master wireless device 12 can be easily wirelessly connected.

Furthermore, due to the master wireless device 12 according to the present embodiment, in the case that the slave wireless device 16 wirelessly connected to the master wireless device 12 deviates from the communication-target region 24, the master control unit 12a transmits the cut-off request signal to the slave wireless device 16 via the master communication unit 12b. Thus, the slave wireless device 16 cuts off the wireless connection, and attains the connection-free state. As a result, it becomes possible, in the case where the slave wireless device 16 has deviated from the communication-target region 24 to enter the communication-target region 24 of another master wireless device 12, for the slave wireless device 16 to be wirelessly connected to the other master wireless device 12. Hence, it becomes possible for wireless communication to be performed between the slave wireless device 16 and the other master wireless device 12 even when the appliance 14, the carriage 28, and the automatic guided vehicle 36 move.

Moreover, since the master control unit 12a transmits to the slave wireless device 16 via the master communication unit 12b the connection request signal with respect to the slave wireless device 16 that has entered the communication-target region 24, the slave wireless device 16 in the connection-free state and the master wireless device 12 can be easily wirelessly connected.

Note that the present invention is not limited to the above-mentioned embodiment, and it goes without saying that a variety of configurations may be adopted based on described content of this specification.

REFERENCE SIGNS LIST

10 . . . wireless communication system
12 . . . master wireless device
12a . . . master control unit, 12b . . . master communication unit
12c . . . master-side table, 14 . . . appliance
16 . . . slave wireless device, 16a . . . slave control unit
16b . . . slave communication unit, 16c . . . slave-side table
18 . . . computer, 20 . . . conveyor line
22 . . . station, 24 . . . communication-target region
26 . . . automobile, 28 . . . carriage
30 . . . sensor, 32 . . . bank
34 . . . communication line, 36 . . . automatic guided vehicle

The invention claimed is:

1. A wireless communication system including: a plurality of master wireless devices that are installed in an industrial facility; and a plurality of slave wireless devices that comprise a bank of slave wireless devices respectively provided to each of a plurality of appliances and that are capable of wireless communication with respective ones of the master wireless devices, wherein
the plurality of appliances are movable in the industrial facility,
the plurality of master wireless devices each include a master control unit and a master communication unit,
the plurality of slave wireless devices each include a slave control unit and a slave communication unit,
wherein
with respect to any one of the slave wireless devices of the plurality of slave wireless devices that has entered a predetermined communication-target region of a respective one of the master wireless devices, the master control unit thereof transmits to the slave communication unit of the one of the slave wireless devices, via the master communication unit thereof, a connection request signal for requesting a wireless connection, the slave control unit of the one of the slave wireless devices performs the wireless connection in a case that the slave communication unit thereof has received the connection request signal, with respect to any one of the slave wireless devices deviating from the communication-target region, the master control unit of a respective master wireless devices wirelessly connected to the one of the slave wireless devices transmits to the slave communication unit of the one of the slave wireless devices, via the master communication unit thereof, a cut-off request signal for requesting cut-off of the wireless connection, the slave control unit of the one of the slave wireless devices cuts off the wireless connection in a case that the slave communication unit thereof has received the cut-off request signal, each respective slave control unit is capable of transmitting to a respective master communication unit, via the slave communication unit thereof, a connection completion signal to an effect that the wireless connection has been completed and a reception completion signal to an effect that the cut-off request signal has been received, the respective master control unit recognizes cut-off of the wireless connection to have, been performed in a case that the reception completion signal is received, or that for a fixed time there is no response to the master communication unit from the respective slave communication unit, and only when the one of said banks is present in the communication-target region of a respective one of the master wireless devices, the respective one of the master wireless devices is communicatively connected with the plurality of slave wireless devices comprising the one of said banks.

2. The wireless communication system according to claim 1, wherein each of the plurality of slave wireless devices further includes a slave-side table storing at least an identification number of the bank to which the slave wireless device itself belongs, and identification numbers of the plurality of master wireless devices, each of the plurality of master wireless devices further includes a master-side table storing at least identification numbers of a plurality of the banks, and an identification number of the master wireless device itself, the master control unit transmits to the slave communication units of the plurality of slave wireless devices belonging to one of the banks that has entered the communication-target region, via the master communication unit, the connection request signal including the identification number of the one of the banks and the identification number of the master control unit itself, referring to the master-side table, and the slave control unit performs the wireless connection in a case that the identification number of the one of the banks included in the connection request signal that has been received by the slave communication unit and the identification number of the bank to which the slave control unit itself belongs match, and that the identification number of the master wireless device included in the connection request signal is stored in the slave-side table, referring to the slave-side table.

3. The wireless communication system according to claim 1, further including a computer connected to the plurality of master wireless devices, wherein the computer outputs an instruction signal instructing the wireless connection or cut-off of the wireless connection with one of the slave wireless devices, to the plurality of master wireless devices, the master control unit:

transmits to the slave communication unit via the master communication unit the connection request signal or the cut-off request signal, in a case that the instruction signal has been inputted from the computer; and outputs to the computer a completion notification signal for notifying completion of the wireless connection or completion of cut-off of the wireless connection, in a case that the connection completion signal to the effect that the wireless connection has been completed, or the reception completion signal to the effect that the cut-off request signal has been received is received by the master communication unit via the slave communication unit from the slave control unit, or that, for a fixed time, there is no response to the master communication unit from the slave communication unit.

4. A slave wireless device provided to a certain appliance and capable of wireless communication with a plurality of master wireless devices that are installed in an industrial facility, wherein, the certain appliance is movable in the industrial facility, the slave wireless device includes a slave control unit and a slave communication unit, and the slave control unit:

performs a wireless connection with the master wireless devices in a case that the slave communication unit has received a connection request signal from the master wireless devices;

cuts off the wireless connection with the master wireless devices in a case that the slave communication unit has received a cut-off request signal from the master wireless device;

is capable of transmitting to the master wireless devices via the slave communication unit a connection completion signal to an effect that the wireless connection has been completed and a reception completion signal to an effect that the cut-off request signal has been received; and cuts off the wireless connection by not making a response to the master wireless devices from the slave communication unit for a fixed time, the slave wireless device is provided to one hank of slave wireless devices, and only when the one bank is present in a communication-target region of one of the master wireless devices, the one of the master wireless devices is communicatively connected with the slave wireless device.

5. A master wireless device installed in an industrial facility and capable of wireless communication with a plurality of slave wireless devices that comprise a bank of slave wireless devices respectively provided to each of a plurality of appliances, wherein, the plurality of appliances are movable in the industrial facility, the master wireless device includes a master control unit and a master communication unit, with respect to the slave wireless device that has entered a predetermined communication-target region of the master wireless device, the master control unit transmits to the slave wireless device via the master communication unit a connection request signal for requesting a wireless connection, in a case that the slave wireless device wirelessly connected to the master wireless device deviates from the communication-target region, the master control unit transmits to the slave wireless device via the master communication unit a cut-off request signal for requesting the slave wireless device to cut-off the wireless connection, the master control unit recognizes cut-off of the wireless connection to have been performed in a case that a reception completion signal is received, from the slave wireless device via the master communication unit, to an effect that the cut-off request signal has been received, or that, for a fixed time, there is no response to the master communication unit from the slave wireless device, and only when the one bank is present in the communication-target region, the master communication unit is communicatively connected with the plurality of slave wireless devices configuring the one bank.

* * * * *